United States Patent [19]

Keshavan

[11] Patent Number: 4,972,912
[45] Date of Patent: Nov. 27, 1990

[54] DIAMOND INSERT

[75] Inventor: Madapusi K. Keshavan, The Woodlands, Tex.

[73] Assignee: Smith International, Inc., Houston, Tex.

[21] Appl. No.: 452,145

[22] Filed: Dec. 18, 1989

[51] Int. Cl.$^5$ .............................................. E21B 10/46
[52] U.S. Cl. .................................. 175/329; 175/410; 407/118
[58] Field of Search ....................... 407/118, 119, 113; 175/329

[56] References Cited

U.S. PATENT DOCUMENTS

| | | | |
|---|---|---|---|
| 4,437,800 | 3/1984 | Araki et al. | 407/119 |
| 4,605,343 | 8/1986 | Hibbs et al. | 407/118 |
| 4,714,385 | 12/1987 | Komanduri | 407/118 |
| 4,716,975 | 1/1988 | Dennis | 407/118 |

Primary Examiner—Frederick R. Schmidt
Assistant Examiner—S. Keating Johns
Attorney, Agent, or Firm—Robert G. Upton

[57] ABSTRACT

A diamond cutter consisting of a polycrystalline diamond layer sintered to a cylindrically shaped tungsten carbide substrate is brazed to a cylindrically shaped mounting surface formed at a cutting end of a tungsten carbide insert body. The cylindrically shaped mounting surface of the insert body is the same diameter as the tungsten carbide substrate hence no fillet of braze material can form adjacent the juncture between the substrate and the insert body at the cutting end of the insert thereby minimizing the damaging affect of a leaching process that forms microvoids or cracks in the insert body.

4 Claims, 2 Drawing Sheets

DIAMOND INSERT

BACKGROUND OF THE INVENTION

I. Field of the Invention

This invention relates to diamond tipped tungsten carbide inserts, the body of the insert being inserted into apertures formed in a body of a rock bit.

More specifically this invention relates to a means to improve the ability of the body of the insert to withstand shear forces encountered by the diamond cutter insert as it is utilized in a rock bit in an earth formation.

II. Description of the Prior Art

Diamond cutter discs as well as diamond insert stud blanks, for example, are fabricated from a tungsten carbide. A tungsten carbide substrate has a diamond layer sintered to a face of the substrate. The disc is then brazed to the stud body, the diamond layer being composed of a polycrystalline material. The synthetic polycrystalline diamond layer is manufactured by Megadiamond, a division of Smith International, Inc. located in Provo, Utah. The diamond insert produced by Megadiamond is known as the M-40 cutter.

The tungsten carbide disc with the synthetic polycrystalline diamond layer secured thereto is normally brazed to a tungsten carbide stud. The stud is designed to be pressed or bonded within the face of, for example, a drag type rock bit.

During the brazing certain elements such as boron silicon in the braze material leaches out the cobalt in the tungsten carbide stud body thereby forming a lower strength brittle alloy or a metallurgical "notch" or crack at the juncture of the braze and the tungsten carbide. This is especially detrimental where a braze fillet forms between the flat surface of the tungsten carbide insert body and the circumferential surface of the tungsten carbide substrate of the diamond disc. This rounded surface is perpendicular to the flat mounting surface over at least half of the diameter of the disc. This phenomenon creates a stress riser at the aforementioned filleted junction between the tungsten carbide substrate and the tungsten carbide body. The weakened juncture in the stud body limits the utility of the diamond cutter. The cutter insert will not withstand severe shear and tensile forces created when the bit is rotated in a borehole.

If the tungsten carbide stud body breaks or shears under shear or bending loads created when the drag bit cuts into a bottomhole formed in an earth formation, the broken cutting end of the stud then drops to the borehole bottom and destroys or damages the rest of the cutters on the bit thus shortening the life of the bit.

The prior art is therefore disadvantaged in that, as a result of the brazing process whereby the diamond cutter substrate is brazed to the end of a tungsten carbide body, leaching of the cobalt from the tungsten carbide body creates a multiplicity of metallurgical notches weakening the stud body at the aforementioned filleted juncture of the substrate and the body.

This invention directs itself to overcoming these weakened areas by redesigning the surfaces to be brazed thereby minimizing the affects of the leaching process thus strengthening the cutters tremendously.

SUMMARY OF THE INVENTION

An object of the present invention is to eliminate the affected area surrounding the braze utilized to secure a diamond cutter substrate to a tungsten carbide body.

A diamond tipped tungsten carbide cutter insert is disclosed consisting of a polycrystalline diamond disc mounted to a substrate. The substrate is subsequently brazed to a tungsten carbide insert body.

The body of the tungsten carbide insert forms a first cutting end and a second base end, the first cutting end forms a cylinder having a flat circumferential surface, the cylinder is the same diameter of the cylindrical tungsten carbide substrate of the polycrystalline diamond disc. The disc is subsequently brazed to the flat circumferential surface. The cylinder of the insert is the same diameter as the substrate of the diamond disc. The molten braze will not form a fillet to adversely affect and weaken the insert body by leaching cobalt from the tungsten carbide thereby forming weakening notches that reduce the ability of the insert body to resist shear/bending stresses.

An advantage then of the present invention over the prior art diamond inserts is the means in which an area of tungsten carbide affected by leaching is removed by forming a cylindrical base for the diamond disc the same diameter of the disc thereby eliminating the damaging fillet formed in the perpendicular juncture between the disc substrate and the flat mounting surface formed by the insert body.

The above noted objects and advantages of the present invention will be more fully understood upon a study of the following description in conjunction with the detailed drawings.

DESCRIPTION OF THE PREFERRED EMBODIMENTS AND BEST MODE FOR CARRYING OUT THE INVENTION

Figure 1:
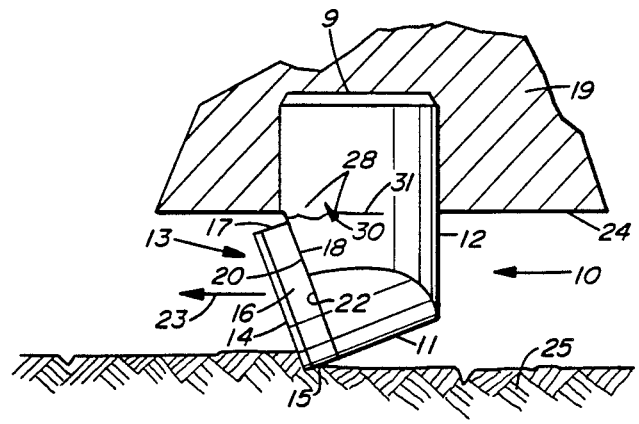
FIG. 1 is a partially sectioned view of a prior art diamond insert mounted in a face of a drag bit, the diamond cutting tip being engaged with an earth formation.

With reference now to the prior art of FIG. 1, a polycrystalline diamond insert generally designated as 10 is shown mounted within the face 24 of a drag bit 19. The drag bit is shown operated in an earthen formation 25. Insert 10 has a base end 9 that is secured within the drag bit 19 and a cutting end 11 which is in contact with the earthen formation 25.

A polycrystalline disc generally designated as 13 is comprised of layer of polycrystalline diamond 14 sintered to a substrate disc 16, the composite diamond disc 13 being subsequently brazed to surface 22 formed in the insert body 12. The layer of braze material 18 between the substrate 16 and the insert body 12 forms an intersection 20 therebetween.

Figure 2:
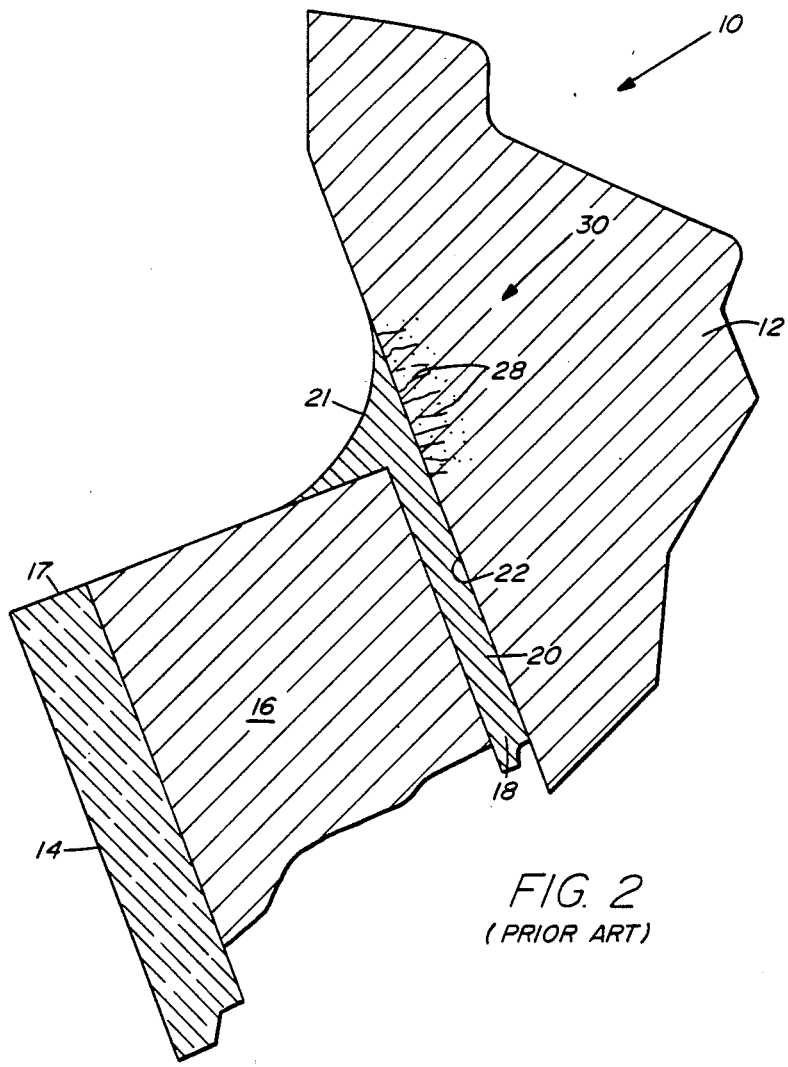
FIG. 2 is an enlarged partial section ("A" of FIG. 1) of the prior art diamond insert illustrating the braze joint between the insert body and the tungsten carbide backed polycrystalline diamond cutter disc.

The encircled portion designated "A" and shown enlarged in the prior art of FIG. 2 indicates an area of very high stress due to the shear or bending forces imparted to this section of the insert body 12 created by the action of the cutting end 15 engaged with the borehole formation 25 (FIG. 1). In prior art inserts, as indicated before, certain elements such as boron, silicon, etc. in the braze material robs or leaches cobalt from the tungsten carbide of the insert body 12 thus creating voids or microcracks. These insert weakening microvoids or cracks adjacent the fillet 21 coupled with severe shear and bending forces generated when the bit 19 is operated in a borehole may cause the insert to shear or break generally along a line 31 (FIG. 1) parallel with face 24 of the drag bit 19.

Referring now to the enlargement of FIG. 2, the intersection 20 between the substrate 16 and the body 12 along face 22 of the body 12 is filled with a braze material 18. Generally an area 17 around the periphery of the polycrystalline disc 13 (opposite to the cutting end 15 of the cutting disc 13) has a fillet 21 that tangents both the substrate 16 and the face 22 of the body 12. Certain elements such as boron, silicon, etc. in the braze leaches cobalt from the carbide creating microvoids or cracks 28 in this critical area of the insert 10.

Experimentation has shown that the flawed inserts of the prior art could only withstand normal leads of about 3,000 lb force applied perpendicular to the diamond face before they would break.

Figure 3:
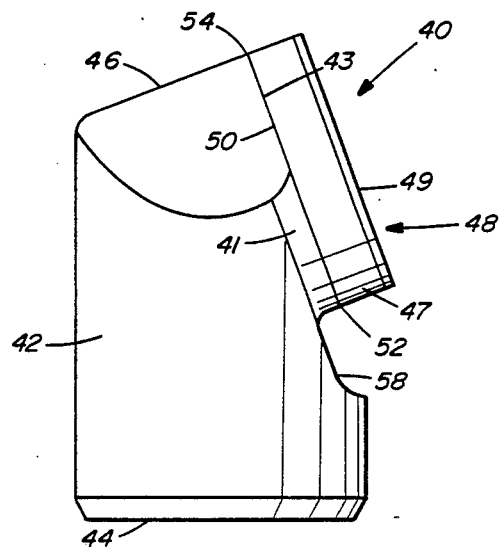
FIG. 3 is a side view of a diamond insert of the present invention illustrating the cylindrical portion of the insert body supporting the base of the diamond cutting disc.
Figure 4:
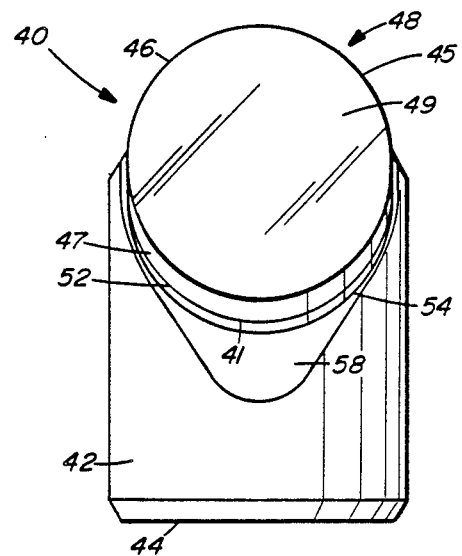
FIG. 4 illustrates a front view of the insert of FIG. 3 further showing the cylindrical base for the diamond disc.
Figure 5:
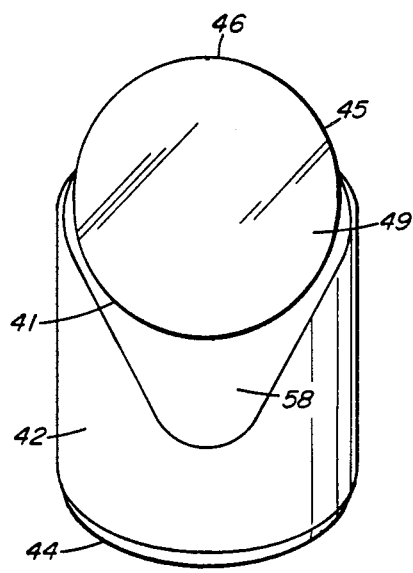
FIG. 5 is a perspective view of the insert, the face of the diamond disc being parallel with the surface of the sheet of drawings further illustrating the lack of the damaging braze fillet of the prior art inserts of FIGS. 1 and 2.

The inserts illustrated with respect to FIGS. 3-5 of the present invention, will withstand normal leads applied perpendicular to the diamond surface between 13,000 and 18,000 lb force before breaking (an average of 14,000 lb force). This tremendous increase in bend strength is quite surprising and is a significant advance in the art.

Again, the prior art of FIGS. 1 and 2 point out the notches 28 in the insert body which critically affects the shear strength of the insert 10.

With reference to FIG. 3, the insert of the present invention generally designated as 40 consists of a tungsten carbide insert body 42 having a base end 44 and a cutting end 46. The tungsten carbide body 42 forms a diamond disc mounting surface 43. A polycrystalline diamond disc generally designated as 48 forms a cutting face 49 and a mounting base 50. The polycrystalline diamond with the substrate of tungsten carbide 47 is secured to the tungsten carbide body 42 by brazing base 50 of the diamond disc 48 to the mounting surface 43 of the tungsten carbide body 42. The molten braze material 52 is dispersed in junction 54 formed between base 50 of disc 48 and mounting surface 43 of the tungsten carbide body 42 during the mounting process.

With reference now to FIGS. 3-5, the diameter 45 of the tungsten carbide substrate 47 of the diamond disc 48 is the same diameter as the cylindrical portion 41 of the tungsten carbide body 42. (See FIG. 4). Since the diameter of the substrate 47 is the same diameter as the cylindrical portion 41 formed on the cutting end 46 of the tungsten carbide body 42, no fillet of braze material 52 is formed such as that illustrated in the prior art of FIGS. 1 and 2.

By providing a cylindrical portion 41 formed in the cutting end 46 of the insert body 42 peripheral surface of the cylindrical portion 41 is the same diameter as the cylindrical periphery of the substrate 47 of the diamond disc 48. No fillet can form, hence no damaging notches will form in a critical area of the insert body 42 such as that shown with respect to prior art of FIGS. 1 and 2.

A planar surface 58 is formed in the tungsten carbide body 42 to allow room to form the cylinder 41 at end 46 of body 42.

It would be obvious to form the tungsten carbide body 42 without the relief potion 58 to form cylindrical portion 42 in the upper portion 46 of the body 42 without departing from the spirit and scope of the invention. The important aspect of the invention is a cylindrical portion formed by the body 42 the same diameter as the substrate of the polycrystalline diamond disc to be brazed to the mounting surface 43 of the insert body 42 so that no fillet can form which would rob cobalt in a critical area in the body 42.

It will of course be realized that various modifications can be made in the design and operation of the present invention without departing from the spirit thereof thus allowing the principal preferred construction and mode of operation of the invention have been explained in what is now considered to represent its best embodiments which have been illustrated and described and should be understood that within the scope of the appended claims the invention may be practiced otherwise than as specifically illustrated and described.

What is claimed is:

1. A diamond insert having a diamond cutter at a first cutting end of a tungsten carbide insert body, the diamond cutter consisting of a layer of diamond sintered to a tungsten carbide substrate body, the substrate body being brazed to the insert body to form said diamond insert, mating surfaces formed by the substrate and the insert body adjacent an intersection formed between said substrate and said insert comprising;

a peripheral surface formed by said substrate body being perpendicular to a base of said substrate body and a cutting surface of said body, and said first cutting end of said insert body forming a peripheral surface perpendicular to a mounting surface formed by said insert body, said peripheral surface completely surrounds said first cutting end, said mounting surface being parallel to said base of said substrate body, said peripheral surface of said substrate body and said peripheral surface of said first cutting end of said insert body aligning with one another forming a continuous and flush surface between said cutting end of said insert body and said substrate body after said diamond cutter is brazed to said first cutting end of said insert, the braze material being confined to said peripheral surface within a perimeter of an intersection formed between said mounting surface and said substrate to minimize the effects of cracking of the insert body due to leaching of cobalt from the mated tungsten carbide surface thereby increasing the ability of the insert body to resist the effects of shear and bending forces imparted to the insert body when said diamond insert cutter is in operation.

2. The invention as set forth in claim 1 wherein said substrate body is cylindrical in shape.

3. The invention as set forth in claim 2 wherein said first cutting end of said insert body is cylindrical in shape and is the same diameter as said cylindrically shaped substrate body.

4. A method of brazing a polycrystalline diamond disc sintered to a cylindrically shaped tungsten carbide substrate body to a cutting end of a tungsten carbide insert body that minimizes the effects of leaching of cobalt from an adjacent tungsten carbide material comprising the steps of:

shaping said first cutting end of said insert body adjacent to a mounting surface formed by said first cutting end, to conform to the cylindrical shape and diameter of the substrate body of said diamond cutter disc, said mounting surface serving as a brazing surface for a base of said substrate body of said diamond disc, and brazing said substrate body of said diamond disc to said mounting surface of said first cutting end of said body, since the diameter of the first cutting end is the same as the diameter of the substrate, no fillet is formed therebetween that extends beyond the perimeter of the diamond disc and the matching mounting surface thereby minimizing the effects of the leaching process that creates microvoids in adjacent tungsten carbide surfaces.

* * * * *